United States Patent
Ostergaard et al.

(10) Patent No.: US 12,099,910 B2
(45) Date of Patent: Sep. 24, 2024

(54) SYSTEM TO INVOKE UPDATE OF MACHINE LEARNING MODELS ON EDGE COMPUTERS

(71) Applicant: Hitachi, Ltd., Tokyo (JP)

(72) Inventors: Jeremy Ostergaard, San Jose, CA (US); Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 883 days.

(21) Appl. No.: 17/187,432

(22) Filed: Feb. 26, 2021

(65) Prior Publication Data
US 2022/0277231 A1 Sep. 1, 2022

(51) Int. Cl.
*G06N 20/20* (2019.01)
*G06F 8/65* (2018.01)
*G06F 11/34* (2006.01)

(52) U.S. Cl.
CPC ............. *G06N 20/20* (2019.01); *G06F 8/65* (2013.01); *G06F 11/3428* (2013.01)

(58) Field of Classification Search
None
See application file for complete search history.

(56) References Cited

U.S. PATENT DOCUMENTS

| | | | |
|---|---|---|---|
| 2019/0102700 A1 | 4/2019 | Babu et al. | |
| 2019/0156246 A1 | 5/2019 | Kuo et al. | |
| 2020/0327371 A1 | 10/2020 | Sharma et al. | |

FOREIGN PATENT DOCUMENTS

| | | | | |
|---|---|---|---|---|
| CN | 114930347 A | * | 8/2022 | ............. G06N 20/00 |
| WO | WO-2021144037 A1 | * | 7/2021 | ............. G06N 3/045 |

OTHER PUBLICATIONS

Martins (Year: 2021).*
European Patent Office. European Search Report dated Jul. 14, 2022. European Patent Application No./Patent No. 22152409.3-1203. Name of Applicant: Hitachi, Ltd. English Language. 9 pages.

* cited by examiner

*Primary Examiner* — David R Vincent
(74) *Attorney, Agent, or Firm* — PROCOPIO, CORY, HARGREAVES & SAVITCH LLP

(57) ABSTRACT

Example implementations described herein involve systems and methods to substantially simultaneously orchestrate machine learning models over multiple resource constrained control edge devices, so that the overall system is more agile to changes in events and environmental conditions where the models have been deployed. The example implementations described herein involve multiple processes that when executed, determine a list of edge devices to be updated along with the corresponding models based on correlation.

15 Claims, 16 Drawing Sheets

| Device ID | OS Version | Codesys | Data Processor | OpenVINO Driver | Machine Vision App | Connected PLC Model |
|---|---|---|---|---|---|---|
| Weight | ⟩ | ⟩ | ⟩ | ⟩ | ⟩ | ⟩ |
| 0001 | Ubuntu 18.04.3 LTS | V3.5 | 1.2.1a | 2019 R1 | 2.2.0 | HX-CP1H16 |
| 0002 | Ubuntu 18.04.3 LTS | V3.5 | 1.2.1a | 2018 R5 | 2.2.0 | HX-CP1H16 |
| 0003 | Ubuntu 18.04.3 LTS | V2.3 | 1.2.1b | 2019 R1 | 2.2.0 | HX-CP1H16 |
| 0004 | Ubuntu 18.04.3 LTS | V2.3 | 1.2.1a | 2018 R5 | 2.2.0 | HX-CP1H16 |
| 0005 | Ubuntu 18.04.3 LTS | V2.3 | 1.2.1a | 2019 R1 | 2.2.0 | HX-CP1H16 |
| 0006 | Ubuntu 18.04.3 LTS | V2.3 | 1.2.1b | 2018 R5 | 2.2.0 | HX-CP1S08 |
| 0007 | Ubuntu 18.04.3 LTS | V3.5 | 1.2.1a | 2019 R1 | 2.2.0 | HX-CP1S08 |
| 0008 | Ubuntu 18.04.3 LTS | V2.3 | 1.2.1a | 2018 R5 | 2.2.0 | HX-CP1S08 |
| 0009 | Ubuntu 18.04.3 LTS | V3.5 | 1.2.1a | 2019 R1 | 2.2.0 | HX-CP1S08 |
| 0010 | Ubuntu 18.04.3 LTS | V2.3 | 1.2.1a | 2018 R5 | 2.2.0 | HX-CP1S08 |

FIG. 9

|      | 0002 | 0003 | 0004 | 0005 | 0006 | 0007 | 0008 | 0009 | 0010 |
|------|------|------|------|------|------|------|------|------|------|
| 0001 | 83%  | 67%  | 83%  | 83%  | 50%  | 67%  | 50%  | 83%  | 50%  |
| 0002 |      | 50%  | 100% | 67%  | 67%  | 50%  | 67%  | 67%  | 67%  |
| 0003 |      |      | 50%  | 83%  | 50%  | 67%  | 50%  | 50%  | 50%  |
| 0004 |      |      |      | 67%  | 67%  | 50%  | 67%  | 67%  | 67%  |
| 0005 |      |      |      |      | 67%  | 50%  | 67%  | 67%  | 67%  |
| 0006 |      |      |      |      |      | 50%  | 100% | 67%  | 100% |
| 0007 |      |      |      |      |      |      | 50%  | 83%  | 50%  |
| 0008 |      |      |      |      |      |      |      | 67%  | 100% |
| 0009 |      |      |      |      |      |      |      |      | 67%  |

| Device set | Scores / Arrangements | | | | | | | | |
|---|---|---|---|---|---|---|---|---|---|
| 1,2 | Arrangement | (1),(2) | (1,2) | | | | | | |
| | Min. avg. group correlation | 100% | 83% | | | | | | |
| | Avg. device correlation to group | 100% | 83% | | | | | | |
| | Number of groups | 50% | 100% | | | | | | |
| 1,2,3 | Arrangement | (1),(2),(3) | (1,2),(3) | (1,2,3) | (2,3),(1) | (1,3),(2) | | | |
| | Min. avg. group correlation | 100% | 100% | 83% | 67% | 67% | | | |
| | Avg. device correlation to group | 100% | 89% | 83% | 67% | 78% | | | |
| | Number of groups | 0% | 50% | 100% | 50% | 50% | | | |
| 1,2,3,4 | Arrangement | (1),(2),(3),(4) | (1,2),(3),(4) | (1,4),(2,3) | (1,2,3),(4) | (1,2),(3,4) | (1,3),(2,4) | (1,2,4),(3) | (1,3,4),(2) | (1,2,3,4) |
| | Min. avg. group correlation | 100% | 100% | 0% | 100% | 67% | 75% | 67% | 83% | 67% |
| | Avg. device correlation to group | 100% | 92% | 67% | 92% | 67% | 75% | 67% | 92% | 75% |
| | Min. avg. group correlation | 100% | 33% | 67% | 67% | 50% | 33% | 67% | 100% | 33% |
| | Avg. device correlation to group | 67% | 67% | 50% | 50% | 67% | 75% | 33% | 100% | 33% |

| Models | Devices | | | | Average | Weighted Avg |
|---|---|---|---|---|---|---|
| | f0001 | f0002 | f0004 | | | |
| Model A | 45% | 84% | 74% | | 68% | 63% |
| Model B | 77% | 75% | 89% | | 80% | 74% |
| Model C | 61% | 71% | 41% | | 58% | 53% |

FIG. 14

SYSTEM TO INVOKE UPDATE OF MACHINE LEARNING MODELS ON EDGE COMPUTERS

BACKGROUND

Field

The present disclosure is directed to edge/cloud systems, and more specifically, to systems and methods to update machine learning models on edge computers.

Related Art

Edge computers, which reside closely to their corresponding data sources or operational technology, are characterized by lightweight computing resources (e.g., processing power, filesystem storage, and memory) and deployment with many other similar edge computers that work together. When using edge computers for intensive computing processes, such as machine learning interference, there can be benefits by taking such characteristics into consideration.

The use of machine learning to infer about one or many hypotheses arising from an event involves the use of a computer running an inference process, a model stored in a filesystem or memory, and a data source about the subject. However, because the subject or environment do not remain static, any machine learning inference process running in a real-world operation will thereby encounter different subjects or situations. For example. the subject may differ as time passes due to a pattern change in a production line, a defect occurring, the orientation of a part on a conveyor belt being shifted, or a mixed production of different parts on a line being produced. The situation of the machine learning inference process may also change as time passes if based on environmental conditions such as light, temperature, dust, and presence and behavior of workers, due to, for example, the movement of the sun affecting light conditions or weather affecting visibility.

For such an inference process, the amount of resources used corresponds to the range of compatibility of the model. For example, to increase the number of subject types or situations an inference process can support, the processing power, memory, or filesystem usage of the process may be higher. In cases where the amount of resources on the computer are constrained, such as with edge computers, this means that models with limited subject and situational compatibility must be used, and these models might suffer from degraded accuracy or incompatibility when the subject or situation changes beyond its range.

In these situations, the limited subject and situational compatibility of the inference processes can be mitigated by replacing the model on the computer. For example, when a change in subject or situation occurs, the replacement of the model can thereby become beneficial. FIG. 1 illustrates the usage of a model replacement procedure with an edge computer. During the replacement procedure for the model on the edge computer, it may be necessary to temporarily stop the inference process, thereby resulting in a period of downtime. In addition, if there is a delay between the change occurring and the replacement procedure being invoked, this increases the amount of time that the old model can cause issues. In practice, it can be common for a human operator of an edge controller to be the actor to identify the change in the situation or subject and invoke the replacement procedure, thereby resulting in lengthy delays.

To reduce the number of downtime periods and delays in model replacement, when multiple edge computers are affected by a common change, a machine learning model orchestration system can be used to simultaneously replace the models on many edge computers as illustrated in FIG. 2. Such a system can reduce or eliminate the delays or downtime by preemptively replacing edge controller models before they are impacted negatively by a change in the subject or situation.

However, such related art systems can still be affected by delays in initial invocation after the change occurs. In the related art, this invocation is done manually or done on a manually entered schedule. In addition, for optimal performance, the orchestration system must be informed which computers should have their models replaced together, and which models should be used for the given situation. In practice, this information is either preprogrammed into the system or is done by basic mathematical logic or queries.

SUMMARY

Aspects of the present disclosure involve a method, which can include, for a model refresh event being triggered by an edge device from a plurality of edge devices, selecting ones of the plurality of edge devices to apply a model refresh based on a first correlation to the edge device; grouping the ones of the plurality of edge devices into a plurality of groups based on a second correlation between the ones of the plurality of edge devices; and selecting models to be applied to each of the plurality of groups.

Aspects of the present disclosure involve a computer program, which can include instructions involving, for a model refresh event being triggered by an edge device from a plurality of edge devices, selecting ones of the plurality of edge devices to apply a model refresh based on a first correlation to the edge device; grouping the ones of the plurality of edge devices into a plurality of groups based on a second correlation between the ones of the plurality of edge devices; and selecting models to be applied to each of the plurality of groups. The instructions of the computer program can be stored on a non-transitory computer readable medium and configured to be executed by one or more processes.

Aspects of the present disclosure involve a system, which can include, for a model refresh event being triggered by an edge device from a plurality of edge devices, means for selecting ones of the plurality of edge devices to apply a model refresh based on a first correlation to the edge device; means for grouping the ones of the plurality of edge devices into a plurality of groups based on a second correlation between the ones of the plurality of edge devices; and means for selecting models to be applied to each of the plurality of groups.

Aspects of the present disclosure involve a management apparatus, which can involve a processor, configured to, for a model refresh event being triggered by an edge device from a plurality of edge devices, selecting ones of the plurality of edge devices to apply a model refresh based on a first correlation to the edge device; grouping the ones of the plurality of edge devices into a plurality of groups based on a second correlation between the ones of the plurality of edge devices; and selecting models to be applied to each of the plurality of groups. The instructions of the computer program can be stored on a non-transitory computer readable medium and configured to be executed by one or more processes.

BRIEF DESCRIPTION OF DRAWINGS

FIG. 9 illustrates an example of device information that can be input into the subprocess of FIG. 8, in accordance with an example implementation.

FIG. 10 illustrates an example of the list of the subsets and members are compiled into a table of devices and their subset membership, in accordance with an example implementation.

FIG. 12 illustrates an example list of score values calculated from possible arrangements of some of the of devices from FIG. 10, in accordance with an example implementation.

FIG. 14 illustrates an example shows an example of how the determination of the best performing model for a group could be done.

DETAILED DESCRIPTION

Figure 1:
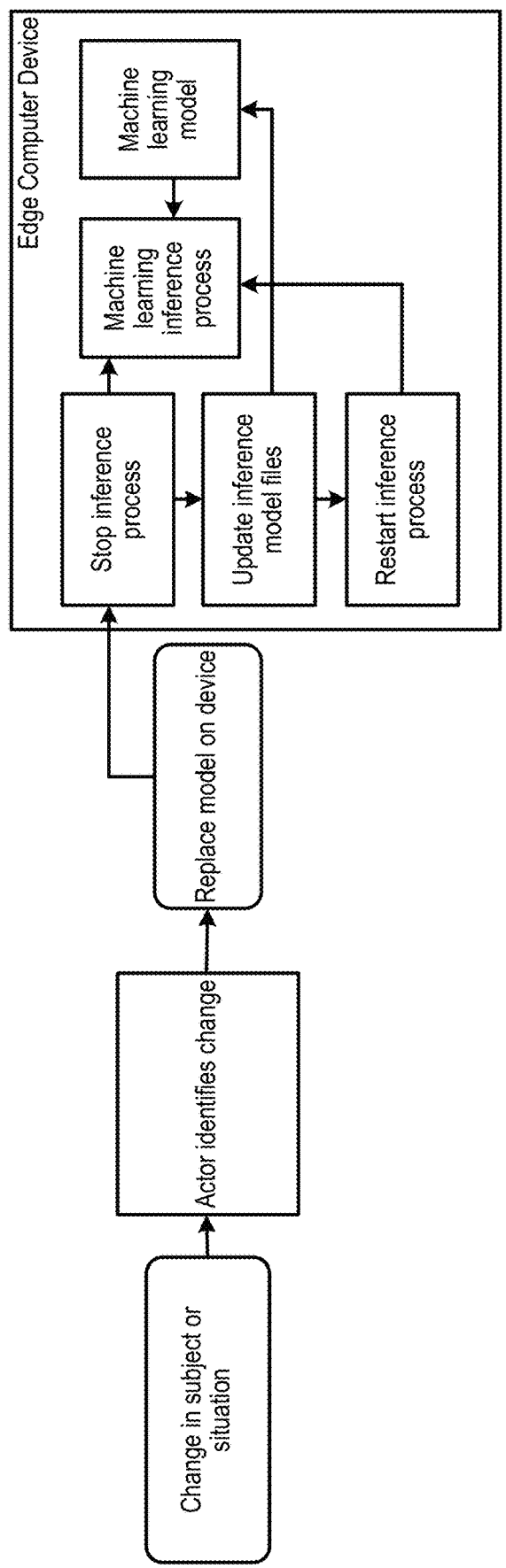
FIG. 1 illustrates the usage of a model replacement procedure with an edge computer.
Figure 2:
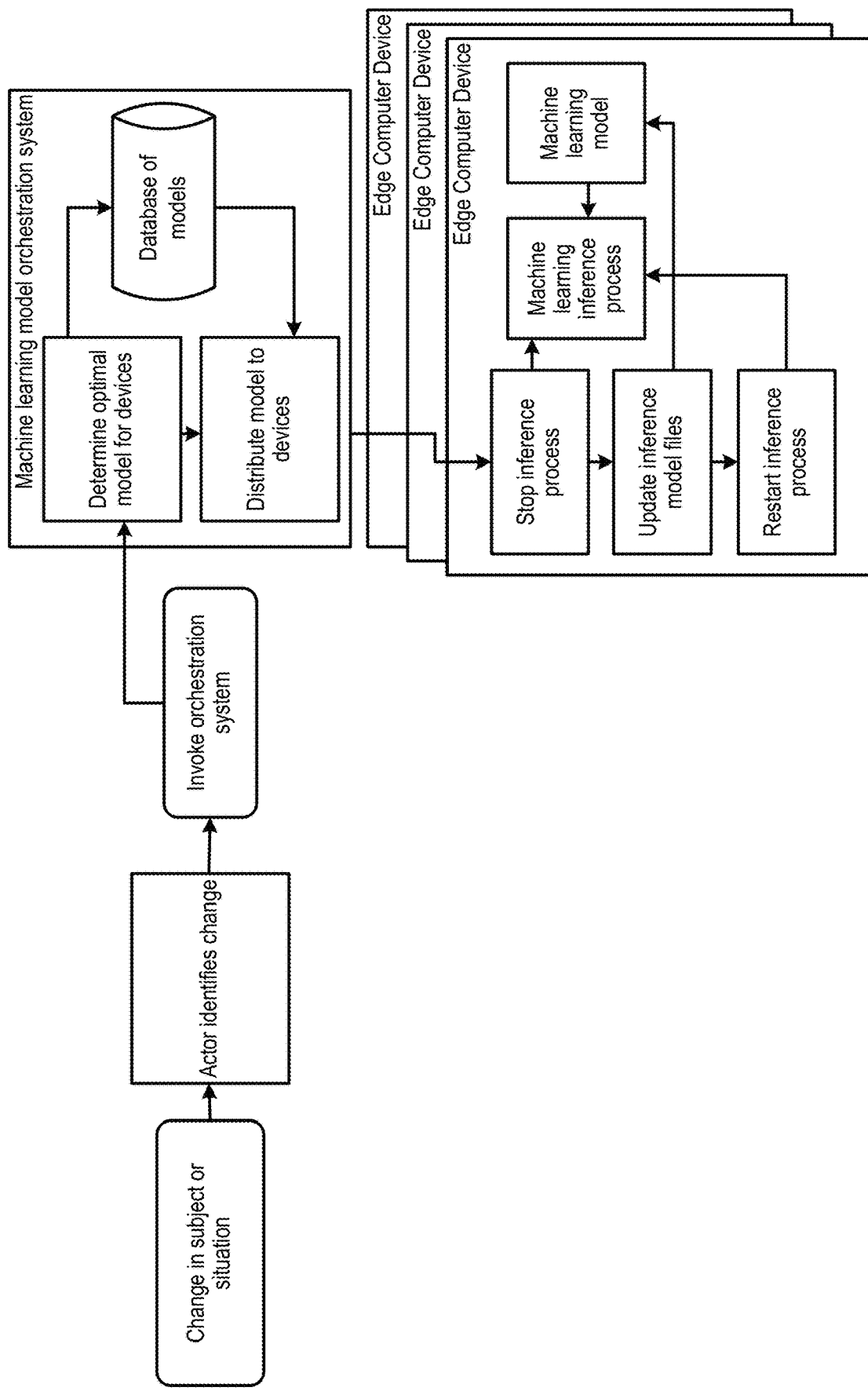
FIG. 2 illustrates an example usage of a machine learning orchestration system.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 3:
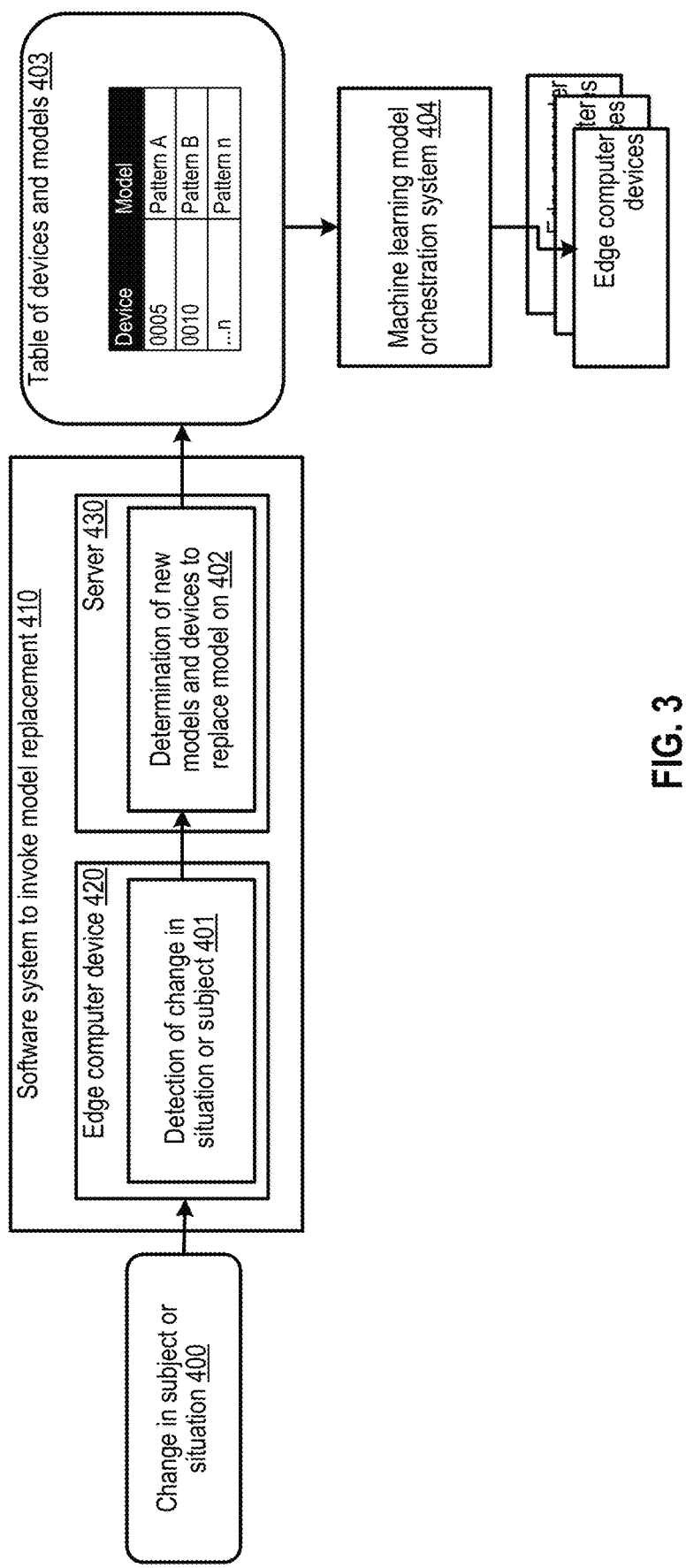
FIG. 3 illustrates an example software system to invoke model refresh on edge computers, in accordance with an example implementation.

FIG. 3 illustrates an example software system to invoke model refresh on edge computers, in accordance with an example implementation. Example implementations described herein involve a software-based system to invoke a machine learning orchestration system 404 to update the machine learning models on multiple edge computers. The example implementations described herein involve automatically detecting a change in inference subject or situation 400 on an edge computer 420 (referred to herein as a refresh event) at 401, then invoking an orchestration system 404 and providing it with an algorithmically generated list 403 of what edge computers should have models replaced and what new models should be used on each edge computer (referred to herein as a model refresh) as determined at 402 by server 430. By detecting a change at the edge computer ("refresh event") automatically, the delay between the refresh event and the completion of the model refresh can be reduced beyond the capability of related art implementations. By algorithmically determining how to perform the model refresh, the performance of a model orchestration system 404 can be increased in terms of accuracy and adaptiveness by removing the need for manual configuration. The proposed model refresh invocation system accomplishes these feats by considering data from edge computers related to the refresh event, edge computer device information from resource management systems, and time series information on inference processes on edge computers.

Figure 4:
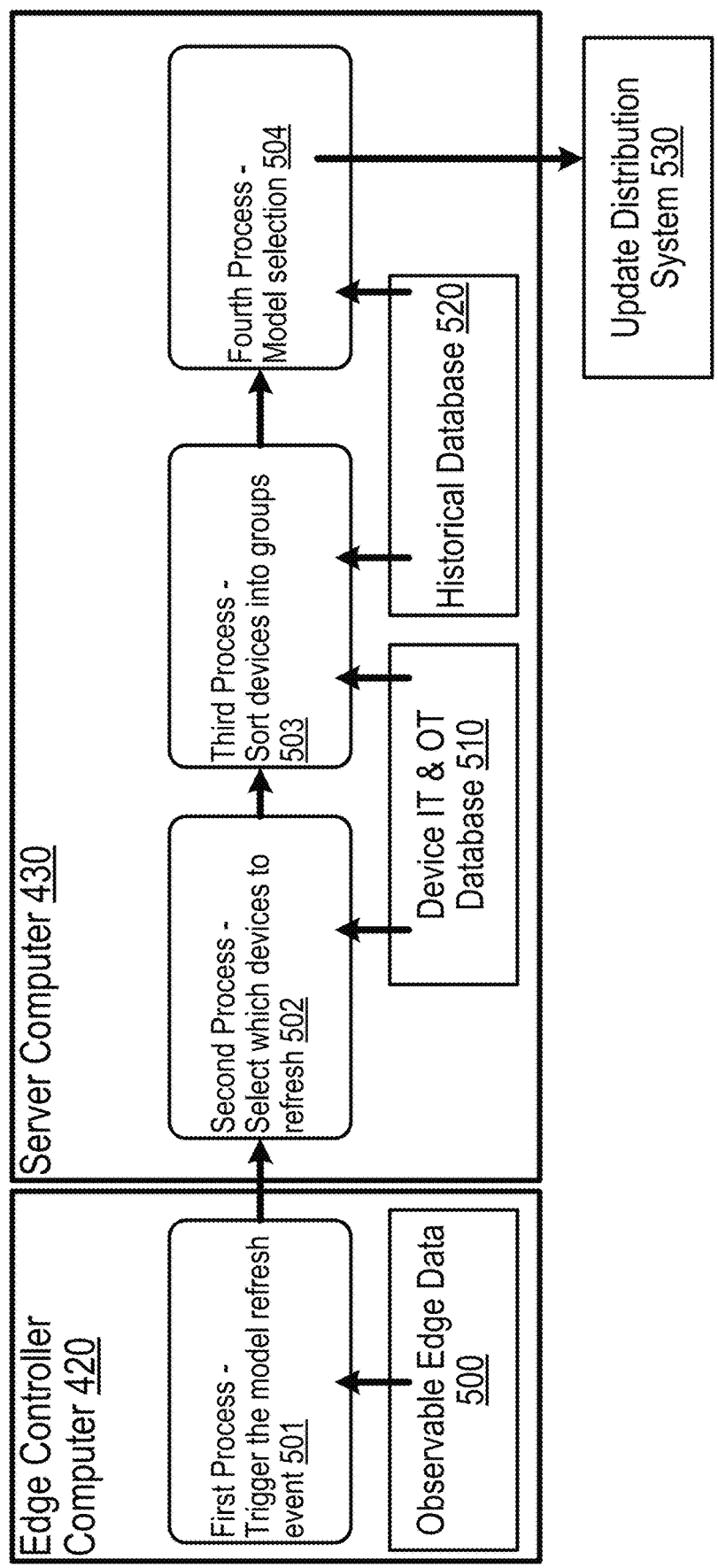
FIG. 4 illustrates an example model refresh system involving four separate processes, in accordance with an example implementation.

FIG. 4 illustrates an example model refresh system involving four separate processes, in accordance with an example implementation. As will be described herein, it is possible for multiple instances of the sub-system described in a first process to exist running on separate edge computers. It is possible for the sub-system described in a second process to receive calls and input from multiple instance of the sub-system described in the first process. By doing so, it makes possible for many or all edge computers in a deployment to be running the sub-system used in the first process, and thus be able to invoke the replacement of models when needed.

In example implementations, four separate processes are used as illustrated in FIG. 4. A first process 501, running continuously on an edge computer 420, identifies the refresh event and triggers the system by analyzing edge data 500. A second process 502, running on a server 430, selects which edge computers to perform a model refresh on by comparing other edge computers with the triggering edge computer 420. A third process 503, running on a server 430, groups the selected edge computers together based on the similarity to each other in order to identify which edge computers should use the same model based on the device information technology (IT) and operational technology (OT) database 510. A fourth process 504, running on a server 430, selects which model is optimal for each group of edge computers to use in response to the refresh event, based on comparing the data from the refresh event to historical events in the database 520.

Figure 5:
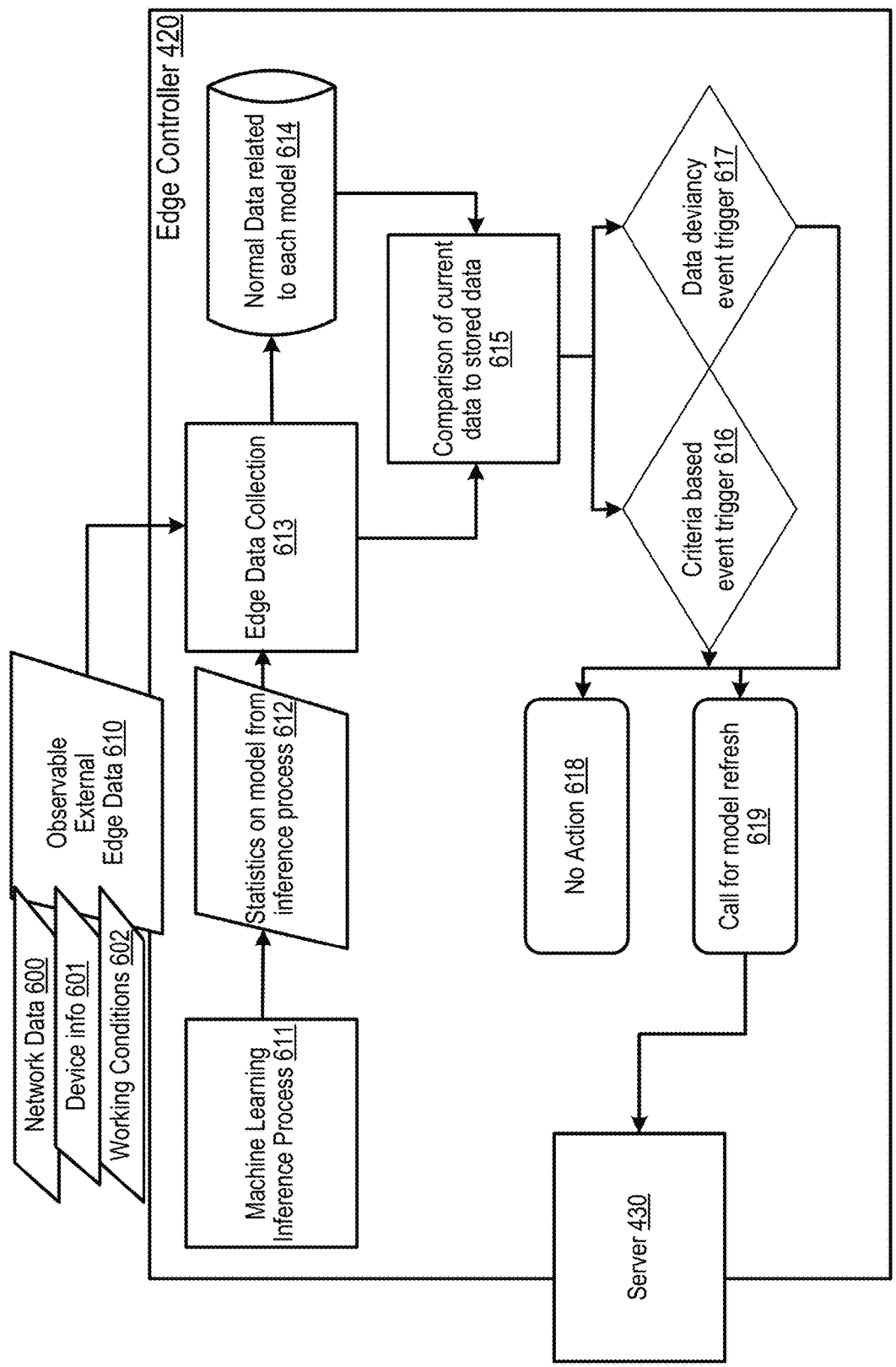
FIG. 5 illustrates an example flow of the first process, in accordance with an example implementation.

FIG. 5 illustrates an example flow of the first process, in accordance with an example implementation. The first process 501 is used to trigger the system, occurs on an edge computer 420, and continuously runs to identify a change in inference subject or situation by analyzing changes in data from edge data devices, inference process output, and working condition information. This process occurs continuously in order to monitor the data for criteria that indicate that the subject type or situation type of the machine learning inference has changed.

Data for the process is collected by an edge data collection function 613 on the edge controller. Two kinds of data are collected—statistics 612 from the machine learning inference process 611 running on the same computer, and external edge data 610 that can be observed by the controller 420. The inference process statistics 612 are collected from available log files, application programming interface (API) or standard output from the local inference process running on the computer, and include records of the process succeeding or failing to infer a subject, confidence rates, error or warning messages, time taken to infer, number of features identified, categorization or type of the subject, general log messages, or unstructured data passed through from the original data source (such as a camera). Observable external edge data 610 is collected by monitoring of network data 600 that is received by the edge computer 420, accessing device information 611 of other devices on the network via protocols, and observing external conditions 602 of the working environment from other data sources.

Network data 600 can include operation status and activity of other networked devices (e.g., a controller sending packets indicating that it has started operating), queries of network ports on other devices to identify running software services or operation system versions, Medium Access Control (MAC) addresses to identify hardware specifications, and general communication data patterns between different devices. In addition to the real-time collected data, the edge computer has a repository or database of the above kinds of data for each machine learning model that indicates the expected/normal data values that should be present when the model is being used.

The first process 501 continuously performs a comparison analysis 615 of the collected edge data to the expected normal data 614 for the currently running model. This analysis calculates the deviancy level between the current data and expected data for each available data type, and a sum deviancy level for all data types together at 617. The determination that a refresh event is indicated by the data is determined by criteria for specific values of data, or by the deviancy level, either for the sum or for specific data types, exceeding a certain threshold as determined at 616. The threshold or the criteria can be set by input from the system operator.

If a refresh event is indicated, the first process 501 calls to the server 430 for a model refresh to take place at 619, and sends also to the server the collected edge data set used for the analysis. Otherwise, no action is taken at 618.

Figure 6:
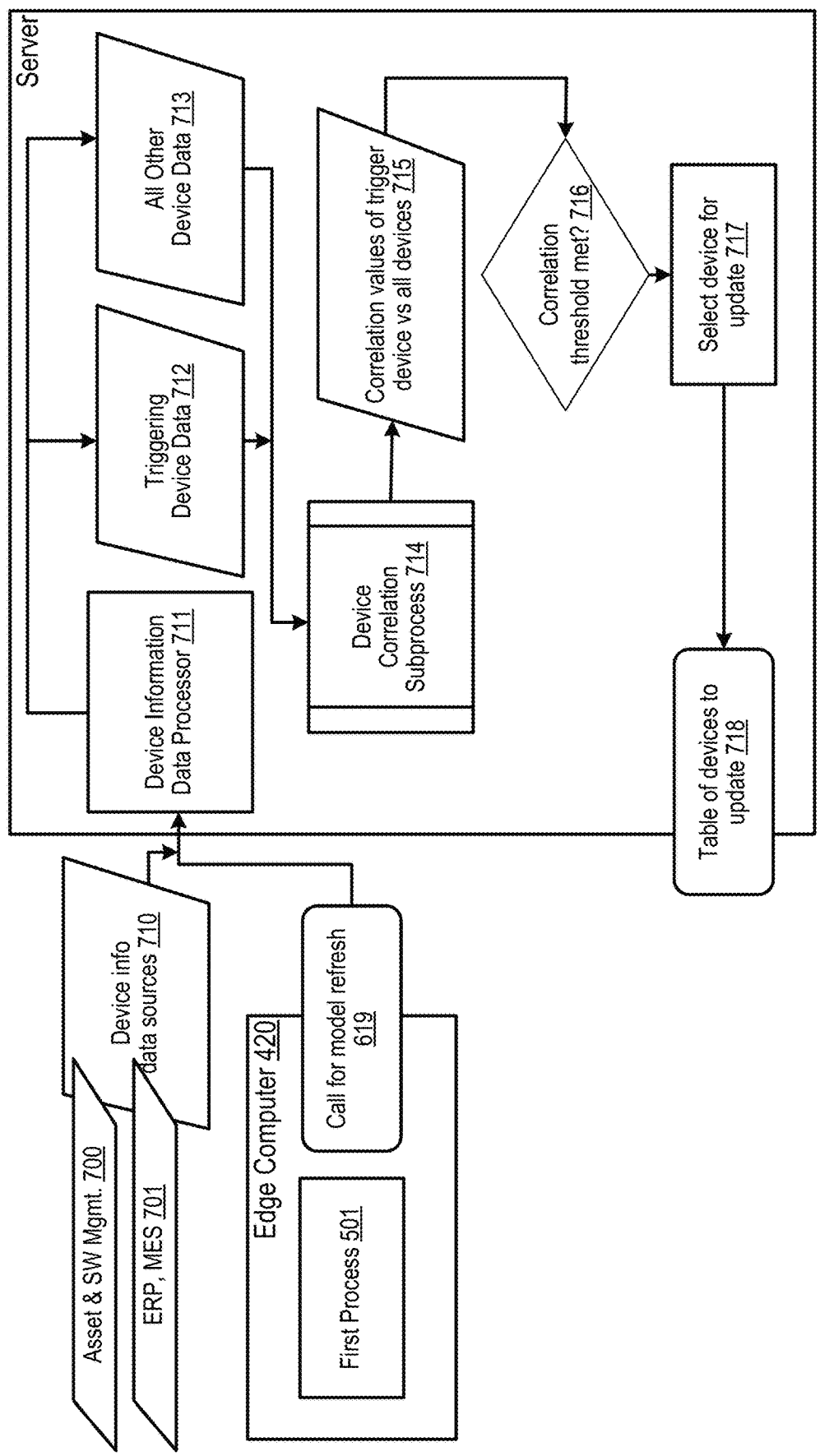
FIG. 6 illustrates an example flow for the second process, in accordance with an example implementation.

FIG. 6 illustrates a flow for the second process, in accordance with an example implementation. The second process 502 occurs on a server after the first process 501 identifies a change and identifies which edge computers should be selected for a model refresh by comparing the data from the triggering edge computer 420 (in the first process 501) to other edge computers. After the call for a model refresh 619 is received, a device information data processor function 711 obtains information on the edge computers by querying device management systems at 710. These systems can include asset, software, hardware or inventory management systems, electronic resource planning systems, or manufacturing execution systems as shown at 700 and 701. The data gathered from these systems is static device information and/or other hardware information. It can include edge computer types, attached hardware, location of deployment, association to certain production lines or other machinery, hierarchy of deployment, network topology, and so on. Furthermore, it can include process information which relates to the usage of the device, such as the schedule of operation, schedule of what subject types should be present, schedule of situation changes, and relation between operation processes and individual computers.

After the data for each edge computer is queried, the data from the triggering edge computer 712 is separated from the set of all edge computer data 713. These two data sets are then analyzed via a device correlation subprocess 714, which determines a correlation value between all other edge computers and the triggering edge computer 420 at 715. Then, based upon the correlation values, a determination is made if each computer is likely to be affected by the same refresh event that the triggering edge computer detected.

This determination is made if the correlation value between the two computers exceeds a certain threshold or matches criteria as shown at 716, which can be set by the system operator. The edge computers determined to be similar to the triggering computer are compiled at 717 into a table and outputted into the following process at 718, along with the compiled data regarding those edge computers.

Figure 7:
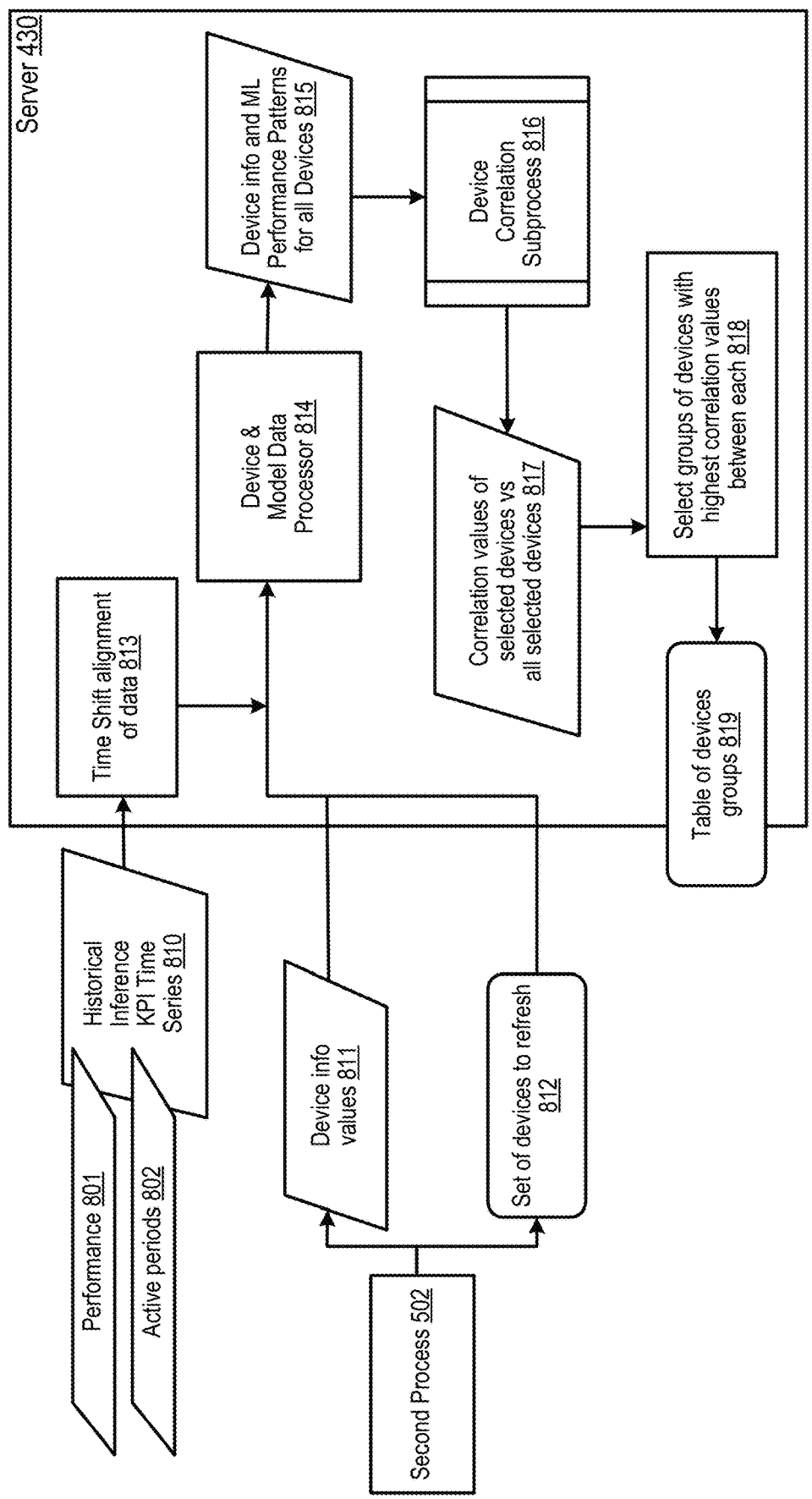
FIG. 7 illustrates an example flow for the third process, in accordance with an example implementation.

FIG. 7 illustrates an example flow of the third process, in accordance with an example implementation. The third process 503 occurs on a server 430 after a set of edge computers has been selected for a model refresh and arranges the set into multiple subsets of similar edge computers by a data comparison regarding each edge computer. The process proceeds after a set of edge computer devices to perform a model refresh on 812 and a compilation of the data of those devices is received 811.

First, a data processor function 814 acquires additional data related to each device and the model used on it from a time series database or other historical data source. This data can include time series information on historical inference process key performance indicators 810, such as active periods, times that subjects were observed, records of the process succeeding or failing to infer a subject, confidence rates, error or warning messages, time taken to infer, or the number of features identified as illustrated at 801 and 802. A time shift alignment function 813 can be performed on this data in order to account for the difference in time for the same subject to reach each edge computer (for example, multiple edge computers in a sequence inferring a subject moving along a conveyor belt). In example implementations, the time series information is utilized so that events from different devices can be aligned if they are time shifted. In an example of multiple edge computers processing the same subject moving along the conveyor belt in sequence, each event of the multiple edge computers detected in sequence can be identified through the time series data, whereupon it can be determined that each edge computer in the sequence is offset from a subsequent edge computer in the sequence by some delta time period (e.g., a few seconds). The data processor then determines the machine learning performance pattern (performance vs time) for the devices by analyzing the performance and activity of the collected time series data at 815. This additional device and model data are then compiled with the received device information at 816.

Figure 11:
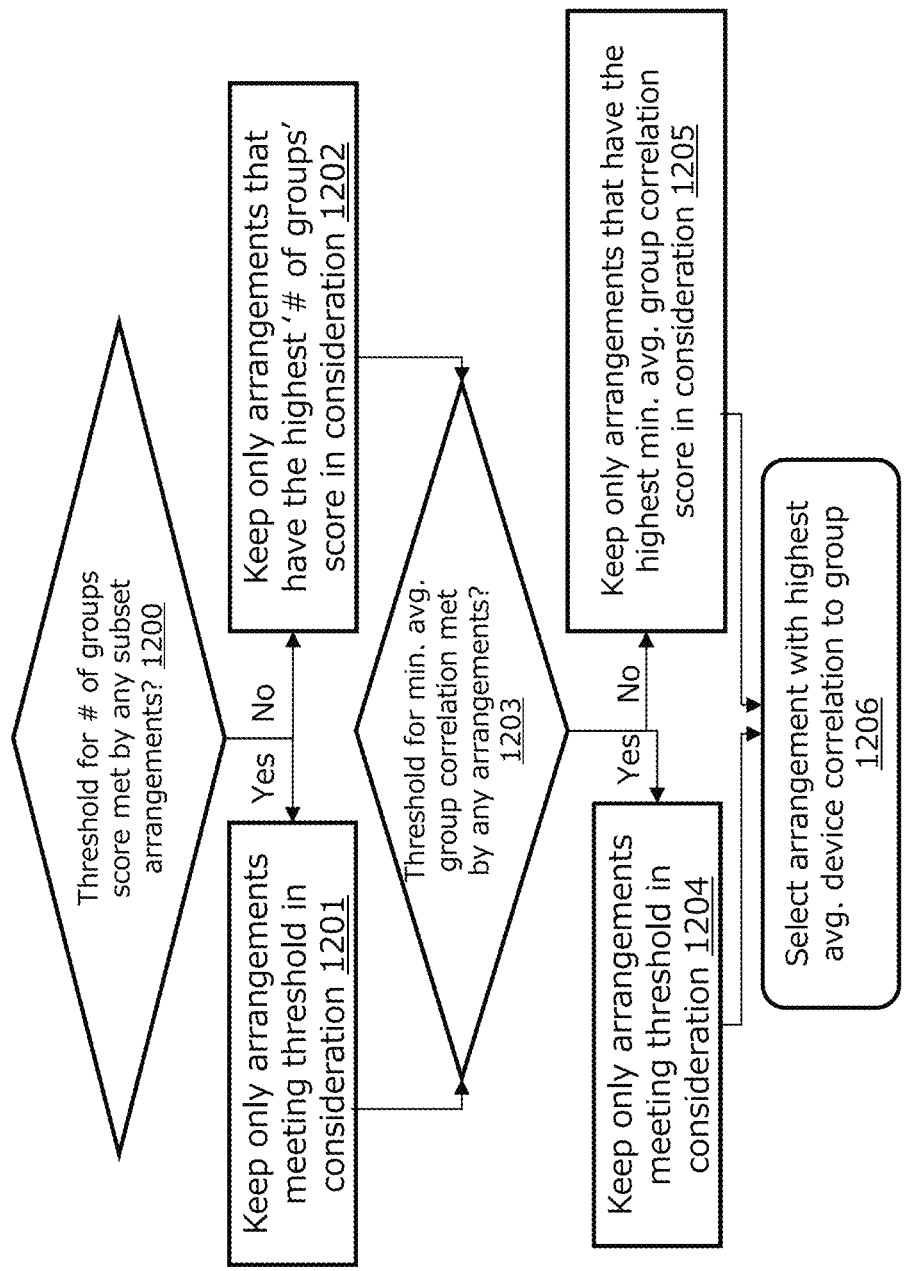
FIG. 11 illustrates an example of the selection process for evaluating each possible combination of devices into non-intersecting groups/subsets, in accordance with an example implementation.

After the data is compiled, it is analyzed via a device correlation subprocess 817, which determines a correlation value of device similarity between each device to each other device based on device information/hardware configuration, resulting in a matrix of device correlation values. Then, based upon the correlation values, a determination if devices with correlating values are likely to be have the most optimal inference process performance if they use the same machine learning model at 818. This determination is made if the average or minimum correlation value between two or more devices exceeds a threshold or matches a certain value criteria, which can be set by the system operator. If this determination is made between multiple computers, then these computers are placed into a subset of devices as a group. In the case where a device is grouped with another device or multiple devices after this determination, it is placed into a subset as a sole member. As a result of the process, each device will be in a subset with one or more members, and the list of the subsets and members are compiled into a table of devices and their subset membership at 819, which is outputted by the process as illustrated in FIG. 11.

Figure 8:
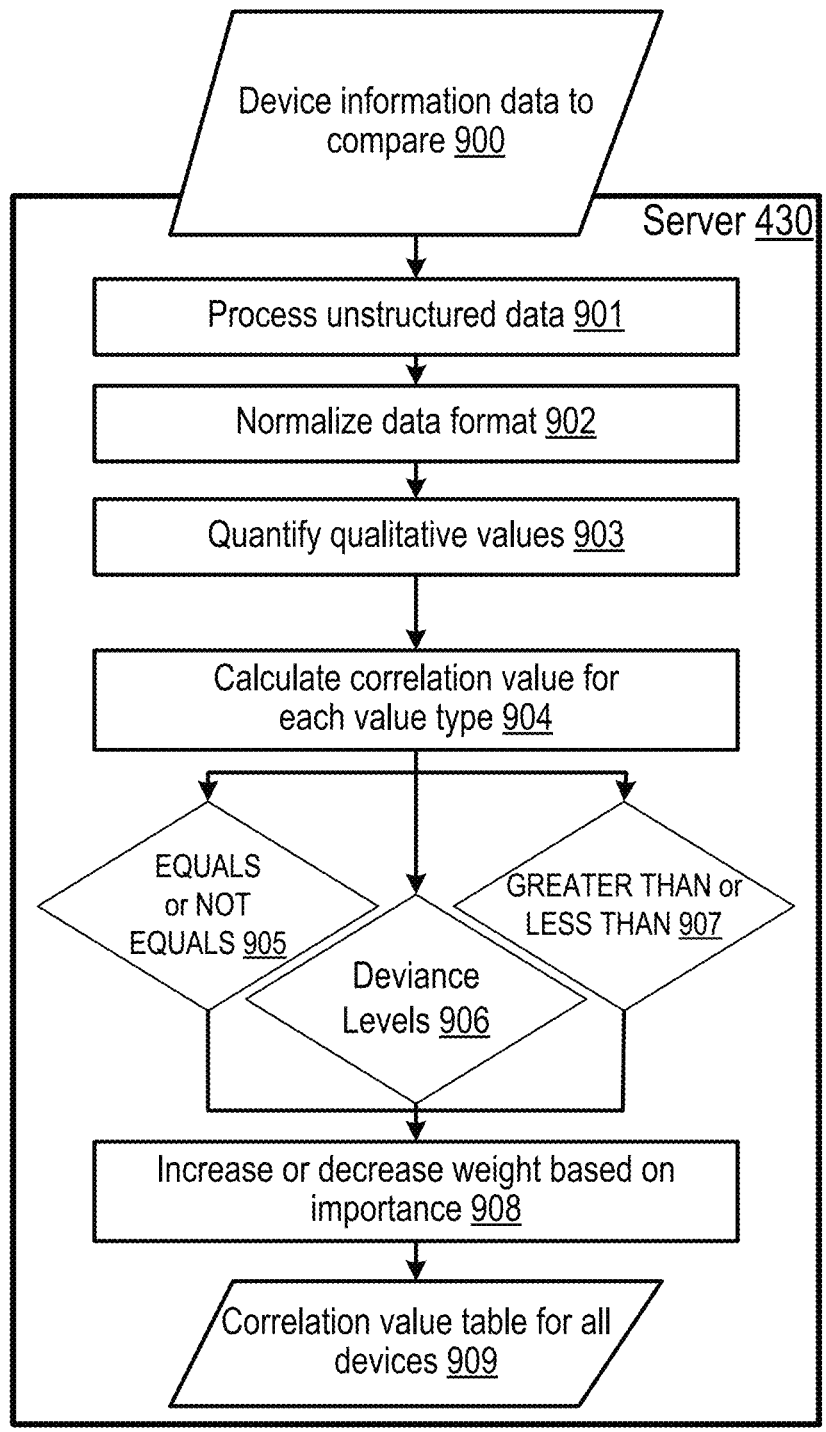
FIG. 8 illustrates a device correlation subprocess, in accordance with an example implementation.

FIG. 8 illustrates a device correlation subprocess, in accordance with an example implementation. The device correlation subprocess used by the second process 502 and the third process 503 takes place on the server 430 and generates correlation values between one device and another based on a set of device information at 900. Examples of the device information that is input into this subprocess is shown in FIG. 10. First at 901, unstructured data from the device information is processed and converted to structured data and categorized into data types existing for other devices if possible. Then at 902, data is normalized into a standard format for each data type for all device values, and a function is done to convert qualitative values to quantified values at 903. Afterwards, the correlation values are calculated as prescribed in the second process 502 or the third process 503 at 904. These values are determined by comparing each value of data types between one device and another, which can be done via basic comparison functions such as if they are equal 905, which value is higher 907, or by more advanced comparison functions such as levels of deviancy between each value depending on the desired implementation as shown at 906. In addition, each data type can have a weight sent to increase or decrease its importance in the calculation at 908, which can be set by the system operator. Afterwards, correlation values are compiled at 909—for the second process 502, the output is a single row of correlation values in a table, and in the third process 503, the output would be a matrix table as illustrated in FIG. 11.

FIG. 9 illustrates an example of device information that can be input into the subprocess of FIG. 8, in accordance with an example implementation. The information can include, but is not limited to, the device identifier (ID), the operating system (OS) version, the codesys version, the data processor, driver information, machine vision application information, the underlying programmable logic controller (PLC) utilized, and various weights, in accordance with the desired implementation.

FIG. 10 illustrates an example of the list of the subsets and members are compiled into a table of devices and their subset membership, in accordance with an example implementation. As shown in FIG. 10, the device IDs are arranged in a matrix from which the correlation between pairs of devices are provided.

Selection of devices during the decision of the second process 502 can be done with a simple evaluation if the correlation value to the triggering device exceeds a threshold value set by the device operator, or otherwise in accordance with the desired implementation.

Selection of devices to group together during the decision of the third process 503 can be done by evaluating each possible combination of devices into non-intersecting groups/subsets. FIG. 11 illustrates an example of the selection process for evaluating each possible combination of devices into non-intersecting groups/subsets, in accordance with an example implementation. This evaluation can be done using scores based on the lowest amount of device groups, the lowest average correlation value of the groups between each of its group members, and the average correlation values of each device between its other group members. As illustrated herein, besides the device correlation values, average group correlation values can also be calculated, which is the average of a group's device correlation values in comparison to the other group members.

For each of these scores, the system operator may set a target score value that is sought to be met during the evaluation at 1201. The score for the lowest number of device groups represents how many devices are actually grouped, and values for it can be targeted in order to select arrangements that have less groups only containing one member as shown at 1201 and 1202. The score for the lowest average correlation value of the groups represents the 'least-correlating' group in the arrangement, and values for it can be targeted in order to help set a minimum correlation metric for the third process 503. Thus, the operator can set the threshold scores for the number of groups, and minimum average group correlation. In an example of number of groups, for an arrangement with n devices in g groups, the score can be calculated as (g/n)*100%, so that a higher score means fewer groups; a 0% score indicates that all devices are in their own group; and a 100% score indicates all devices can be in one group. Operator can choose a lower score if the devices vary significantly beyond a threshold, or a higher score if the devices are very similar. Hence, the process of FIG. 11 can be adjusted according to the desired implementation.

In an example of the minimum average group correlation score, it is the lowest group average correlation value of all the groups in the arrangement, and indicates what would be acceptable for the worst correlated group in the arrangement. The operator can choose a lower score if there is a higher tolerance for dissimilar devices being grouped together, or a higher score for a lower tolerance of dissimilar devices being grouped together, and can thus be adjusted depending on the desired tolerance. Thus, the flow at 1200, 1201, and 1202 remove from consideration arrangements that don't meet the "number of groups" threshold. If none meet the threshold, keep only the ones with the best score At 1203, the score for the average correlation values of each device represents how closely each device 'fits' in its group, and can be used to compare different group arrangements to determine the best arrangement after other thresholds have been met as shown at 1204 and 1205. Thus, at the process of 1203, 1204, and 1205, the flow removes arrangements that fail to meet the minimum average group correlation threshold from consideration. If none meet the threshold, the the flow can keep only the ones with the best score. While a group consisting of a single device would result in a perfect group correlation score (since that device would perfectly match itself), a single-device group does not provide benefits in the group-based model selection in the fourth process 504, so arrangements with single-device groups should be selected against, and arrangements with lower number of groups should be selected for. At 1206, the resulting selection is thereby the arrangement with the highest average correlation to the group, wherein the winner is selected by the highest average device correlation to group. Ties can be resolved in accordance to the desired implementation, such as, but not limited to, resolving firstly by average device correlation to group, secondly by minimum average group correlation, and thirdly by number of groups.

FIG. 12 illustrates list of example score values calculated from possible arrangements of some of the of devices from FIG. 10, in accordance with an example implementation. The first arrangement for each device set demonstrates what could be a traditional model selection process that does not use the process from the third process 503, wherein devices are not grouped together. As illustrated in FIG. 12, the device set indicates a combination of devices for group consideration, and the arrangements or subsets within the device set that can be considered as groups. Each arrangement is evaluated based on the minimum average group correlation, average device correlation to the group, and the number of groups through the process of FIG. 11. In the example of FIG. 12, the process starts with all possible arrangements of groups, to which the group correlation is calculated in the device correlation subprocess of FIG. 11 for each group in each arrangement. Then, the group correlation is calculated as in the device correlation subprocess for each group in each arrangement. For each arrangement, the two scores are calculated, with an additional score such as the average device correlation to group. This is the average of all the group correlation values of all groups in the arrangement, weighted by the size of the groups. The results thereby indicate the average of how correlated the devices are to the rest of their group and indicate how optimal a particular group is.

Once determined and evaluated, the subset groups of devices can then be utilized for the fourth process as described below.

Figure 13:
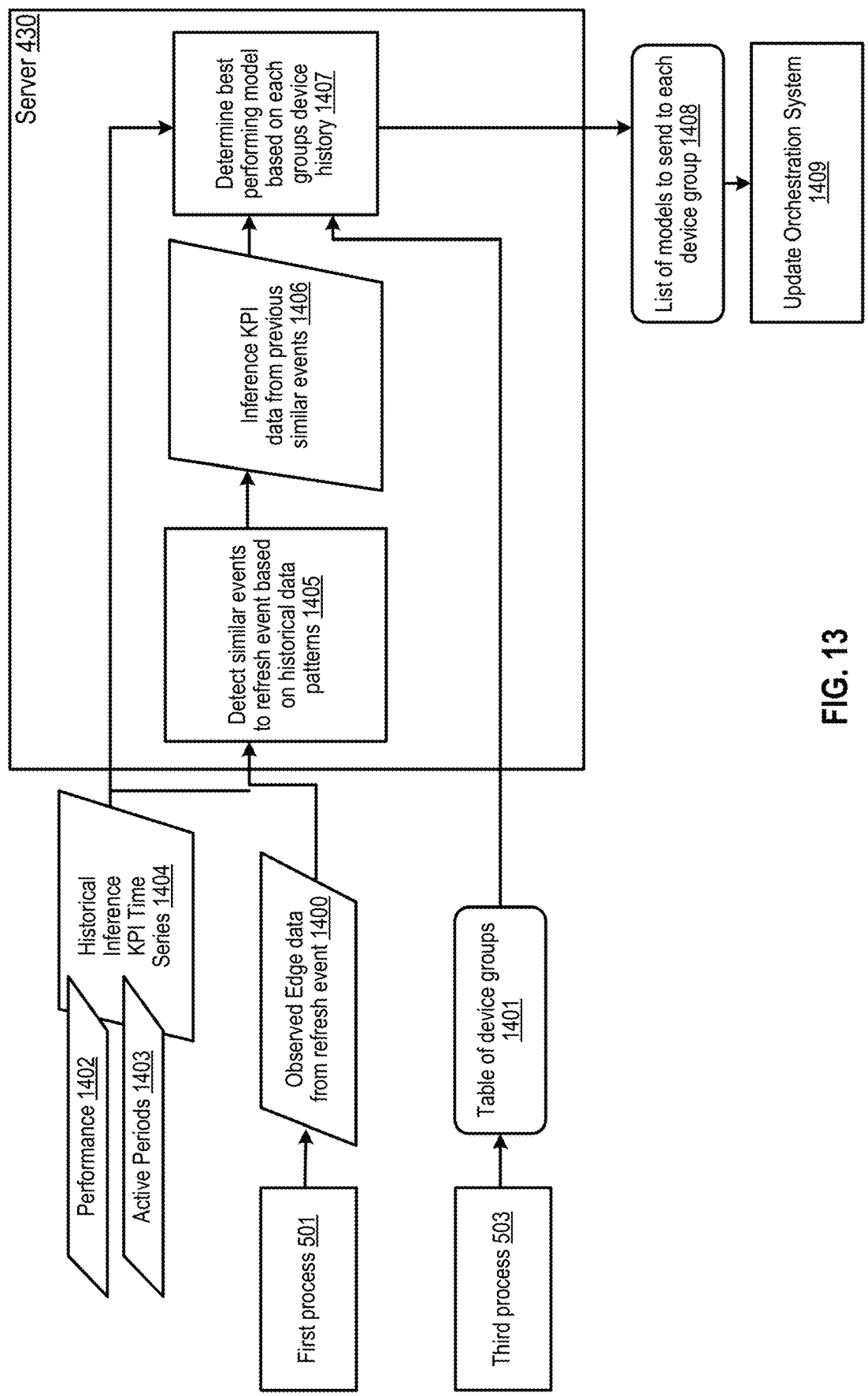
FIG. 13 illustrates an example of the fourth process procedure to select an optimal model for each subset of edge computers, in accordance with an example implementation.

FIG. 13 illustrates an example flow of the fourth process, in accordance with an example implementation. The fourth process 504 occurs on a server after the subsets of similar devices to refresh models of have been determined, and selects the model most likely to perform optimally for each subset by comparing the data related to the refresh event from the first process 501 to a historical time series database of previous data from the edge controllers in each subset. First, at 1405, the data is compared to identify similar events in the history of data to the current refresh event at 900. As described in the first process 501, the current 'live' data 1400 is sent by the edge device when a refresh event is triggered, including statistics from the edge computer machine learning inference process. This data is then compared to historical statistics from machine learning inference processes in the same deployment 1404, and these statistics can include key performance indicators 1402 of the inference process, along with the 'live' data captured 1403 when changes to these inference processes were invoked.

By comparing the captured live data of these events from historical captured data, identification of similar events can be done using basic comparisons or using more advanced logic, similar to those used in the device comparison subprocess. After similar events are determined, the key performance indicators (KPI) of the inference processes of the edge computers are analyzed at 1406 to determine which models have had the best performance in these similar events. This analysis is done by calculating a quantifiable adjusted value based on each key performance indicator for each model used during each similar event on each edge computer in the subset, and then combining all adjusted values to determine which model has performed best under events similar to the current one historically. Based on this analysis, and an analysis of all historical model performance in similar events from the subset as a whole, a single model is selected that will give the highest average performance for the edge computers in the subset at 1407.

After this process is completed for each subset, the results can be compiled into a final table of edge computers and what model each computer should receive 404 as derived from the original list of device groups 1401. The machine learning orchestration 404 is then invoked at 1409 using an interface to call for sending new models to the edge computers, and the information in the table is thus provided. As a result of this invocation, the orchestration system 404 then interacts with the listed edge computers in the table to replace the machine learning inference model on each of them to the model specified by this system to update the distribution system 530. Ultimately, the result of this machine learning replacement invocation system should be that each edge computer should be using the model determined to be optimal by this system.

FIG. 14 illustrates an example shows an example of how the determination of the best performing model for a group could be done. Given that a KPI score for each model is calculated based on the models' KPIs, the optimal model for a device group can be determined, for example, by averaging the scores for each device's models, weighed by the device's average correlation value to the rest of the devices in the group. A traditional model selection system without consideration for device grouping may only look at an individual device's historical models' KPI, which is more susceptible to being impacted negatively by outliers in KPI or errors during the past events that changed the KPIs from what they normally would be. By selection the model by a group-based evaluation, the impact of irregular historical model KPIs can be reduced by adding consideration of KPI values from other correlating devices.

Through the example implementations described herein, this system can be utilized to dynamically respond to changes in subjects or situations for machine learning edge processes. Possible applications of this system include reacting to unexpected changes of a product model being produced on a manufacturing production line, a rare fault of some production equipment affecting products down the line, items being in the wrong orientation for a machine vision process, or unexpected changes in lighting condition for a factory. Compared to similar systems to trigger the switching of machine learning models, the present disclosure can identify and react to a new event faster, improve accuracy by correcting non-optimal model selection in subsequent switches of models, and reduce the labor needed to manually categorize the relationship between devices and between events and models by using data analysis.

Figure 15:
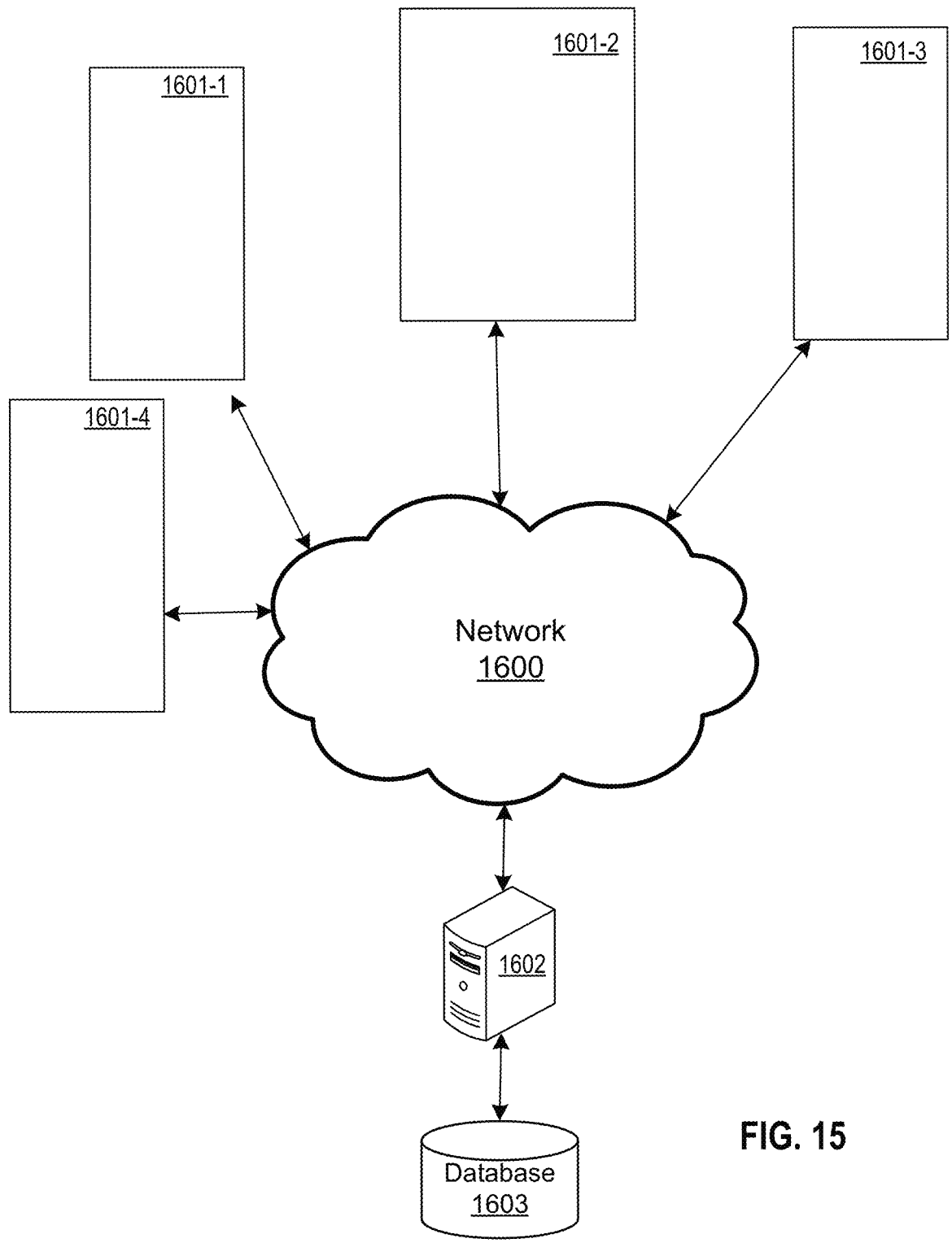
FIG. 15 illustrates a system involving a plurality of edge devices with connected sensors and a management apparatus, in accordance with an example implementation.

FIG. 15 illustrates a system involving a plurality of edge devices with connected sensors and a management apparatus, in accordance with an example implementation. One or more edge devices with connected sensors 1601-1, 1601-2, 1601-3, and 1601-4 are communicatively coupled to a network 1600 which is connected to a management apparatus 1602, which facilitates functionality for an Internet of Things (IoT) gateway or other manufacturing management system. The management apparatus 1602 manages a database 1603, which contains historical data collected from the sensors of the edge devices 1601-1, 1601-2, 1601-3, and 1601-4, which can include labeled data and unlabeled data as received from the edge devices 1601-1, 1601-2, 1601-3, and 1601-4. In alternate example implementations, the data from the sensors of the edge devices 1601-1, 1601-2, 1601-3, 1601-4 can be stored to a central repository or central database such as proprietary databases that intake data such as enterprise resource planning systems, and the management apparatus 1602 can access or retrieve the data from the central repository or central database. Such edge devices can include robot arms with sensors, turbines with sensors, lathes with sensors, and so on in accordance with the desired implementation. A model refresh event can be triggered by any of the edge devices 1601-1, 1601-2, 1601-3, 1601-4 based on one or more of a deviation of predicted data from a model of the edge device to current data or detection of a criteria in the current data indicating a status change to the edge device requiring a model change as described herein.

Figure 16:
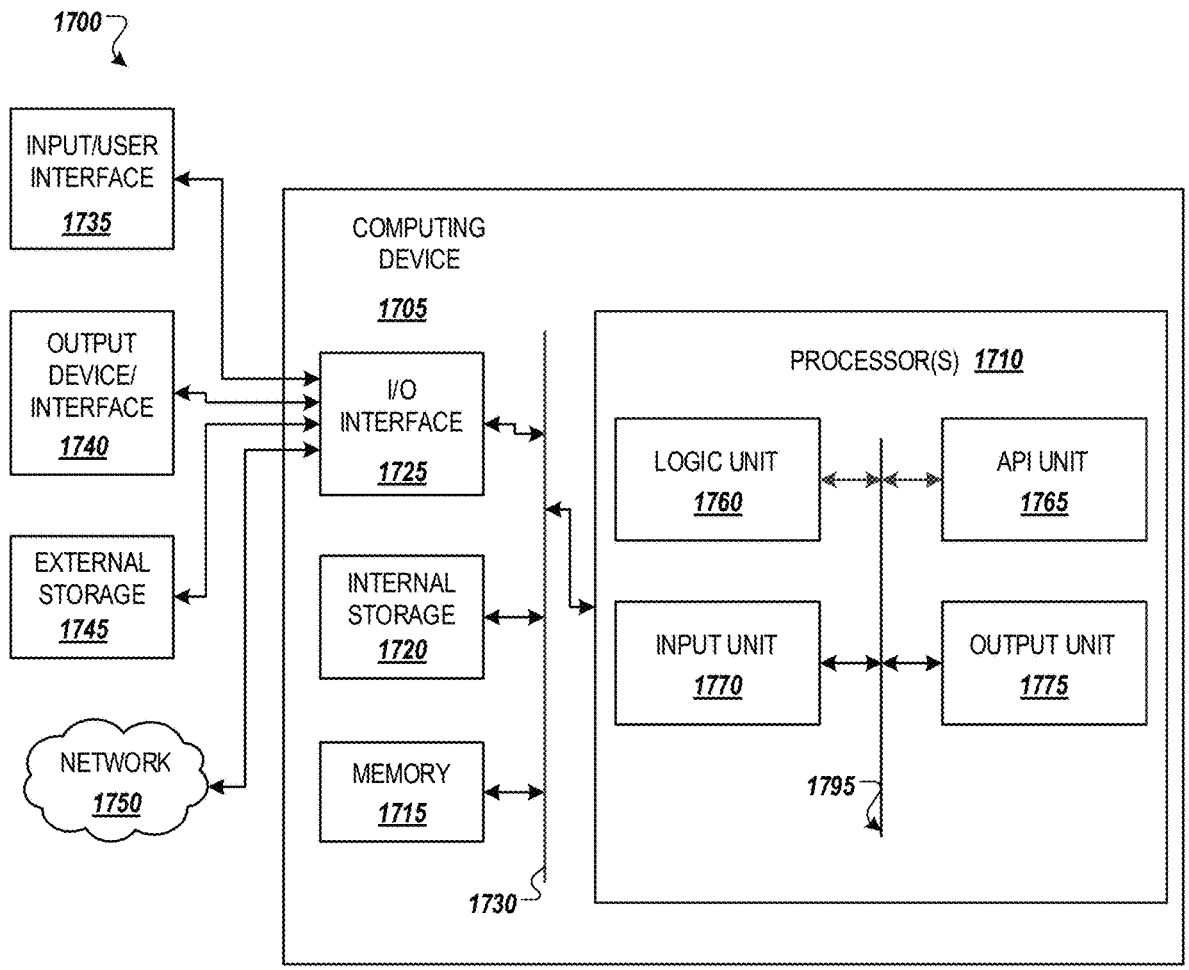
FIG. 16 illustrates an example computing environment with an example computer device suitable for use in some example implementations.

FIG. 16 illustrates an example computing environment with an example computer device suitable for use in some example implementations, such as a management apparatus 1602 as illustrated in FIG. 15 as facilitating the functions of server 430, or such as an edge controller 420.

Computer device 1705 in computing environment 1700 can include one or more processing units, cores, or processors 1710, memory 1715 (e.g., RAM, ROM, and/or the like), internal storage 1720 (e.g., magnetic, optical, solid state storage, and/or organic), and/or I/O interface 1725, any of which can be coupled on a communication mechanism or bus 1730 for communicating information or embedded in the computer device 1705. I/O interface 1725 is also configured to receive images from cameras or provide images to projectors or displays, depending on the desired implementation.

Computer device 1705 can be communicatively coupled to input/user interface 1735 and output device/interface 1740. Either one or both of input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1740 may include a display, television, monitor, printer, speaker, braille, or the like. In some example implementations, input/user interface 1735 and output device/interface 1740 can be embedded with or physically coupled to the computer device 1705. In other example implementations, other computer devices may function as or provide the functions of input/user interface 1735 and output device/interface 1740 for a computer device 1705.

Examples of computer device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1705 can be communicatively coupled (e.g., via I/O interface 1725) to external storage 1745 and network 1750 for communicating with any number of networked components, devices, and systems, including one or more computer devices of the same or different configuration. Computer device 1705 or any connected computer device can be functioning as, providing services of, or referred to as a server, client, thin server, general machine, special-purpose machine, or another label.

I/O interface 1725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, local area network, wide area network, a telephonic network, a cellular network, satellite network, and the like).

Computer device 1705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1710 can execute under any operating system (OS) (not shown), in a native or virtual environment. One or more applications can be deployed that include logic unit 1760, application programming interface (API) unit 1765, input unit 1770, output unit 1775, and inter-unit communication mechanism 1795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1765, it may be communicated to one or more other units (e.g., logic unit 1760, input unit 1770, output unit 1775). In some instances, logic unit 1760 may be configured to control the information flow among the units and direct the services provided by API unit 1765, input unit 1770, output unit 1775, in some example implementations described above. For example, the flow of one or more processes or implementations may be controlled by logic unit 1760 alone or in conjunction with API unit 1765. The input unit 1770 may be configured to obtain input for the calculations described in the example implementations, and the output unit 1775 may be configured to provide output based on the calculations described in example implementations.

Processor(s) 1710 can be configured to, for a model refresh event being triggered by an edge device from a plurality of edge devices, select ones of the plurality of edge devices to apply a model refresh based on a first correlation to the edge device; group the ones of the plurality of edge devices into a plurality of groups based on a second correlation between the ones of the plurality of edge devices; and select models to be applied to each of the plurality of groups as illustrated in FIG. 4.

Processor(s) 1710 can be configured to determine the first correlation, by intaking first data from the ones of the plurality of edge devices and second data from remaining ones of the plurality of edge devices, the first data including first static device information and/or first process information associated with the ones of the plurality of edge devices and the second data including second static device information and/or second process information associated with the remaining ones of the plurality of edge devices; and calculating the first correlation between the between the ones of the plurality of edge devices and the remaining ones of the plurality of edge devices from the first data and the second data as illustrated in FIG. 6.

Processor(s) 1710 can be configured to determine the second correlation, by calculating the second correlation between the ones of the edge devices from static device information, process information, and the machine learning performance patterns of the ones of the plurality of edge devices as derived from historical key performance indicators (KPIs) as illustrated in FIG. 7.

Processor(s) 1710 can be configured to select the models to be applied to each of the plurality of groups by selecting first ones of the plurality of groups having a number of devices meeting a threshold; selecting from the first ones of the plurality of groups, second ones of the plurality of groups having the highest group correlation score above a threshold; and selecting, for each of the second groups, a model having a highest average key performance indicator across each of the edge devices in the each of the second groups as illustrated in FIG. 13.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
for automatic detection of a model refresh event at an edge device from a plurality of edge devices:
selecting ones of the plurality of edge devices to apply a model refresh based on a first correlation to the edge device;
grouping the ones of the plurality of edge devices into a plurality of groups based on a second correlation between the ones of the plurality of edge devices; and
selecting models to be applied to each of the plurality of groups,
wherein the automatic detection of the model refresh event is triggered by one or more of a deviation of predicted data from a model of the edge device to current data or automatic detection of a criteria in the current data indicating a status change to the edge device requiring a model change,
wherein performance of grouped model selection and application triggered by detection of the model refresh event improve downtime periods and delays in model replacement.

2. The method of claim 1, further comprising determining the first correlation, the determining the first correlation comprising:
intaking first data from the ones of the plurality of edge devices and second data from remaining ones of the plurality of edge devices, the first data comprising first static device information associated with the ones of the plurality of edge devices and the second data comprising second static device information associated with the remaining ones of the plurality of edge devices; and
calculating the first correlation between the between the ones of the plurality of edge devices and the remaining ones of the plurality of edge devices from the first data and the second data.

3. The method of claim 1, further comprising determining the second correlation, the determining the second correlation comprising:
calculating the second correlation between the ones of the edge devices from static device information, process information, and the machine learning performance patterns of the ones of the plurality of edge devices as derived from historical key performance indicators (KPIs).

4. The method of claim 1, wherein the selecting the models to be applied to each of the plurality of groups comprising:
selecting first ones of the plurality of groups having a number of devices meeting a threshold;
selecting from the first ones of the plurality of groups, second ones of the plurality of groups having the highest group correlation score above a threshold; and
selecting, for each of the second groups, a model having a highest average key performance indicator across each of the edge devices in the each of the second groups.

5. The method of claim 1, further comprising determining the first correlation, the determining the first correlation comprising:
intaking first data from the ones of the plurality of edge devices and second data from remaining ones of the plurality of edge devices, the first data comprising first process information associated with the ones of the plurality of edge devices and the second data comprising second process information associated with the remaining ones of the plurality of edge devices; and
calculating the first correlation between the between the ones of the plurality of edge devices and the remaining ones of the plurality of edge devices from the first data and the second data.

6. A non-transitory computer readable medium, storing instructions for executing a process, the instructions comprising:
for automatic detection of a model refresh event at an edge device from a plurality of edge devices:
selecting ones of the plurality of edge devices to apply a model refresh based on a first correlation to the edge device;
grouping the ones of the plurality of edge devices into a plurality of groups based on a second correlation between the ones of the plurality of edge devices; and
selecting models to be applied to each of the plurality of groups,
wherein the automatic detection of the model refresh event is triggered by one or more of a deviation of predicted data from a model of the edge device to current data or automatic detection of a criteria in the current data indicating a status change to the edge device requiring a model change,
wherein performance of grouped model selection and application triggered by detection of the model refresh event improve downtime periods and delays in model replacement.

7. The non-transitory computer readable medium of claim 6, the instructions further comprising determining the first correlation, the determining the first correlation comprising:
intaking first data from the ones of the plurality of edge devices and second data from remaining ones of the plurality of edge devices, the first data comprising first static device information associated with the ones of the plurality of edge devices and the second data comprising second static device information associated with the remaining ones of the plurality of edge devices; and
calculating the first correlation between the between the ones of the plurality of edge devices and the remaining ones of the plurality of edge devices from the first data and the second data.

8. The non-transitory computer readable medium of claim 6, further comprising determining the second correlation, the determining the second correlation comprising:
calculating the second correlation between the ones of the edge devices from static device information, process information, and the machine learning performance patterns of the ones of the plurality of edge devices as derived from historical key performance indicators (KPIs).

9. The non-transitory computer readable medium of claim 6, wherein the selecting the models to be applied to each of the plurality of groups comprising:
selecting first ones of the plurality of groups having a number of devices meeting a threshold;
selecting from the first ones of the plurality of groups, second ones of the plurality of groups having the highest group correlation score above a threshold; and
selecting, for each of the second groups, a model having a highest average key performance indicator across each of the edge devices in the each of the second groups.

10. The non-transitory computer readable medium of claim 6, further comprising determining the first correlation, the determining the first correlation comprising:
intaking first data from the ones of the plurality of edge devices and second data from remaining ones of the plurality of edge devices, the first data comprising first process information associated with the ones of the plurality of edge devices and the second data comprising second process information associated with the remaining ones of the plurality of edge devices; and
calculating the first correlation between the between the ones of the plurality of edge devices and the remaining ones of the plurality of edge devices from the first data and the second data.

11. An apparatus configured to manage a plurality of edge devices, the apparatus comprising:
a processor, configured to:
for automatic detection of a model refresh event at an edge device from a plurality of edge devices:
select ones of the plurality of edge devices to apply a model refresh based on a first correlation to the edge device;
group the ones of the plurality of edge devices into a plurality of groups based on a second correlation between the ones of the plurality of edge devices; and
select models to be applied to each of the plurality of groups,
wherein the automatic detection of the model refresh event is triggered by one or more of a deviation of predicted data from a model of the edge device to current data or automatic detection of a criteria in the current data indicating a status change to the edge device requiring a model change,
wherein performance of grouped model selection and application triggered by detection of the model refresh event improve downtime periods and delays in model replacement.

12. The apparatus of claim 11, the processor configured to determine the first correlation, by:
intaking first data from the ones of the plurality of edge devices and second data from remaining ones of the plurality of edge devices, the first data comprising first static device information associated with the ones of the plurality of edge devices and the second data comprising second static device information associated with the remaining ones of the plurality of edge devices; and
calculating the first correlation between the between the ones of the plurality of edge devices and the remaining ones of the plurality of edge devices from the first data and the second data.

13. The apparatus of claim 11, the processor configured to determine the second correlation, by:
calculating the second correlation between the ones of the edge devices from static device information, process information, and the machine learning performance patterns of the ones of the plurality of edge devices as derived from historical key performance indicators (KPIs).

14. The apparatus of claim 11, wherein the processor is configured to select the models to be applied to each of the plurality of groups by:
selecting first ones of the plurality of groups having a number of devices meeting a threshold;
selecting from the first ones of the plurality of groups, second ones of the plurality of groups having the highest group correlation score above a threshold; and
selecting, for each of the second groups, a model having a highest average key performance indicator across each of the edge devices in the each of the second groups.

15. The apparatus of claim 11, the processor configured to determine the first correlation, by:
intaking first data from the ones of the plurality of edge devices and second data from remaining ones of the plurality of edge devices, the first data comprising first process information associated with the ones of the plurality of edge devices and the second data comprising second process information associated with the remaining ones of the plurality of edge devices; and
calculating the first correlation between the between the ones of the plurality of edge devices and the remaining ones of the plurality of edge devices from the first data and the second data.

\* \* \* \* \*